(12) United States Patent
Tylman

(10) Patent No.: US 9,025,720 B2
(45) Date of Patent: May 5, 2015

(54) CONTROL ROD DRIVE SHAFT UNLATCHING TOOL

(75) Inventor: Louis J. Tylman, Acme, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1144 days.

(21) Appl. No.: 13/151,305

(22) Filed: Jun. 2, 2011

(65) Prior Publication Data

US 2011/0299648 A1 Dec. 8, 2011

Related U.S. Application Data

(60) Provisional application No. 61/352,484, filed on Jun. 8, 2010.

(51) Int. Cl.
*G21C 19/00* (2006.01)
*G21C 19/115* (2006.01)

(52) U.S. Cl.
CPC .................................. *G21C 19/115* (2013.01)

(58) Field of Classification Search
CPC .......... G21C 19/10; G21C 7/103; G21C 7/22; G21C 19/32; G21C 19/00; G21C 19/115; G21C 19/105; G21C 19/11; G21C 19/02; G21C 19/04; G21C 19/08; G21Y 2002/201; G21Y 2002/402; G21Y 2004/30; G21Y 2004/39; G05G 7/04; G05G 7/14; G05G 7/16
USPC ........ 294/86 A, 93, 14, 25, 15; 376/236, 219, 376/242, 233, 239, 245, 235, 364
See application file for complete search history.

(56) References Cited

U.S. PATENT DOCUMENTS 2,794,670 A * 6/1957 Menegus et al. ........... 294/86.14
3,186,489 A * 6/1965 Farrar et al. .................... 166/138

(Continued)

FOREIGN PATENT DOCUMENTS

CN 1203429 A 12/1998
EP 0626699 A1 11/1994

(Continued)

OTHER PUBLICATIONS

Drawings of Existing Control Rod Drive Shaft Unlatching Tool Having Pneumatically Operated Latch Gripper Assembly.

*Primary Examiner* — Jack W Keith
*Assistant Examiner* — Julia Prendergast
(74) *Attorney, Agent, or Firm* — Richard J. Coldren; Westinghouse Electric Company LLC

(57) ABSTRACT

A CRDS unlatching tool includes a support assembly and a latching assembly, wherein the support assembly is received within the latching assembly in a manner wherein the latching assembly is moveable relative to the support assembly. The support assembly has a plurality of latch fingers and at least one pin, each of the latch fingers being movable between a latched position wherein the latch finger is structured to engage and hold the CRDS an unlatched position wherein the latch finger is structured to not engage the CRDS. The latching assembly includes a first sleeve member and a second sleeve member, the second sleeve member having at least one slot, wherein the at least one pin is moveably received within the at least one slot. The latching assembly is movable from a latched state to an unlatched state wherein the latch fingers are actuated by the first sleeve member.

8 Claims, 9 Drawing Sheets

(56) References Cited

U.S. PATENT DOCUMENTS

| | | | |
|---|---|---|---|
| 3,941,653 A | | 3/1976 | Thorp, II |
| 3,992,255 A | | 11/1976 | DeWesse |
| 4,244,616 A | * | 1/1981 | Buchalet .................. 294/95 |
| 4,801,422 A | | 1/1989 | Turner et al. |
| 5,329,563 A | | 7/1994 | Baversten |
| 5,442,666 A | | 8/1995 | Meuschke et al. |
| 5,600,685 A | | 2/1997 | Izzo et al. |
| 7,616,728 B2 | | 11/2009 | Gilmore et al. |

FOREIGN PATENT DOCUMENTS

| | | | | |
|---|---|---|---|---|
| FR | 2 394 149 A | | | 1/1979 |
| FR | 2394149 A | * | | 2/1979 |
| JP | H095483 A | | | 1/1997 |

* cited by examiner

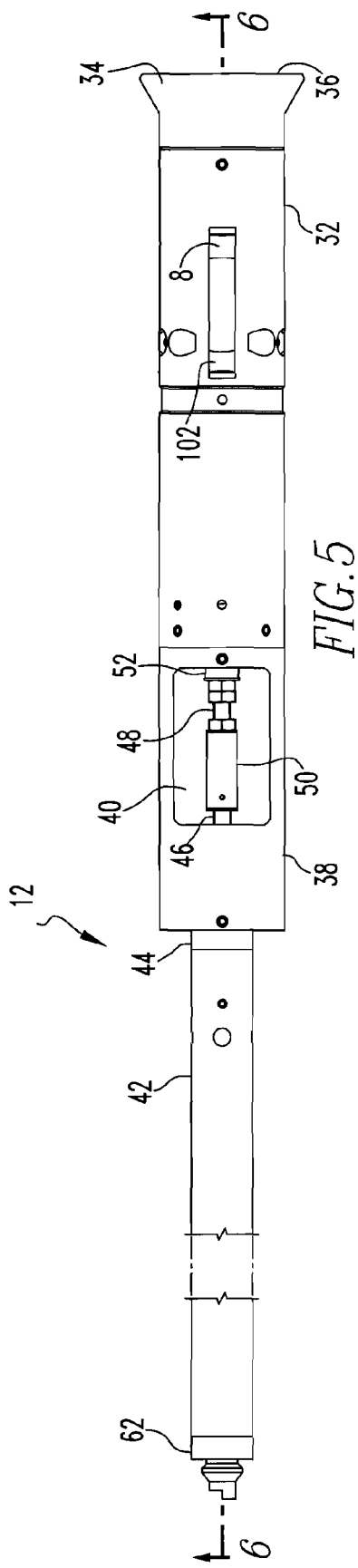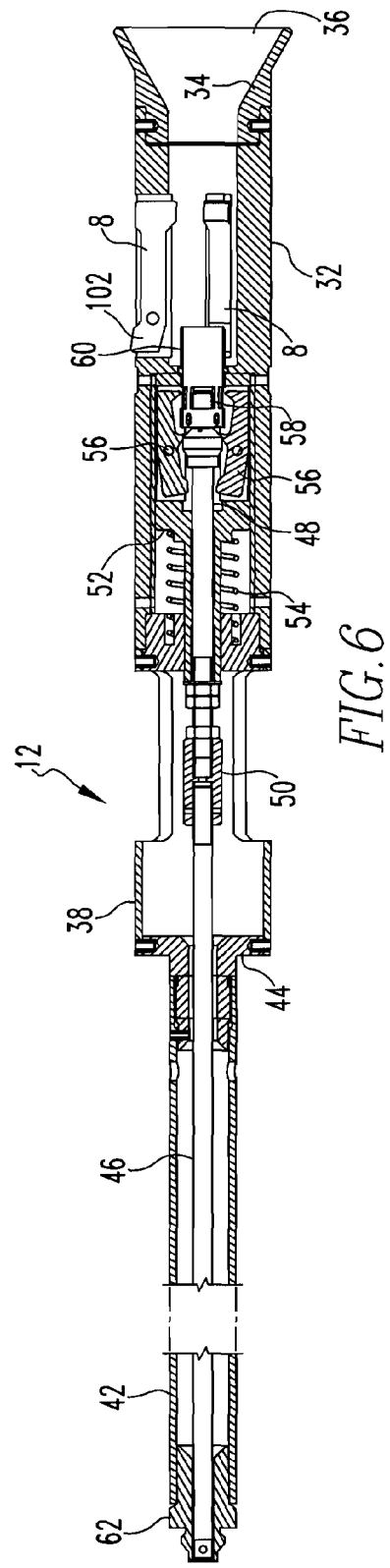

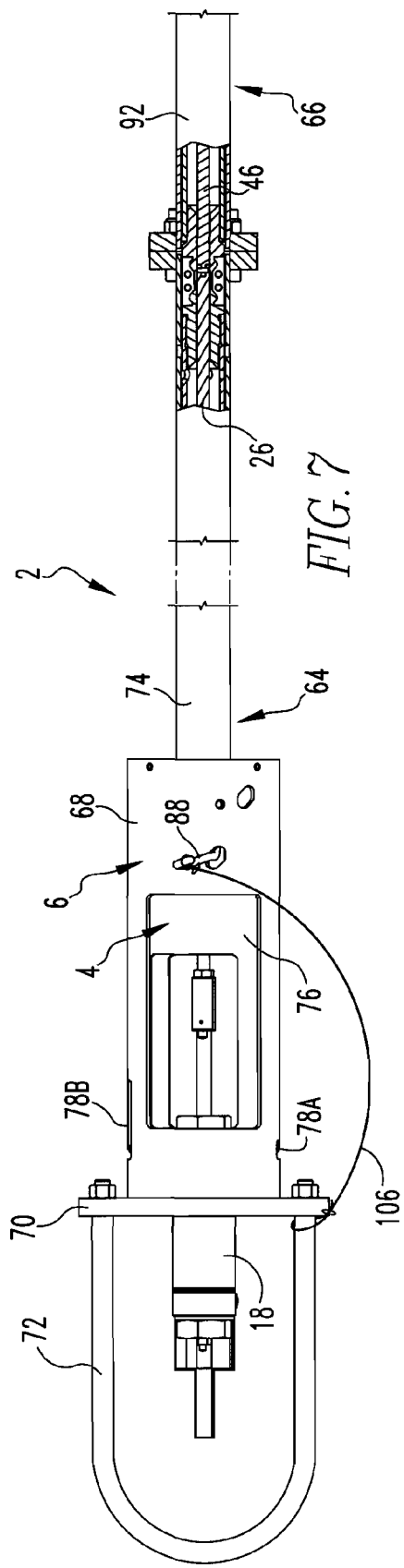
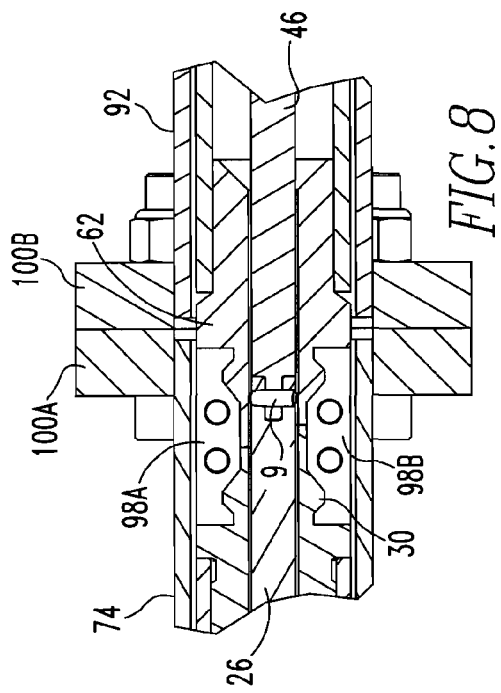

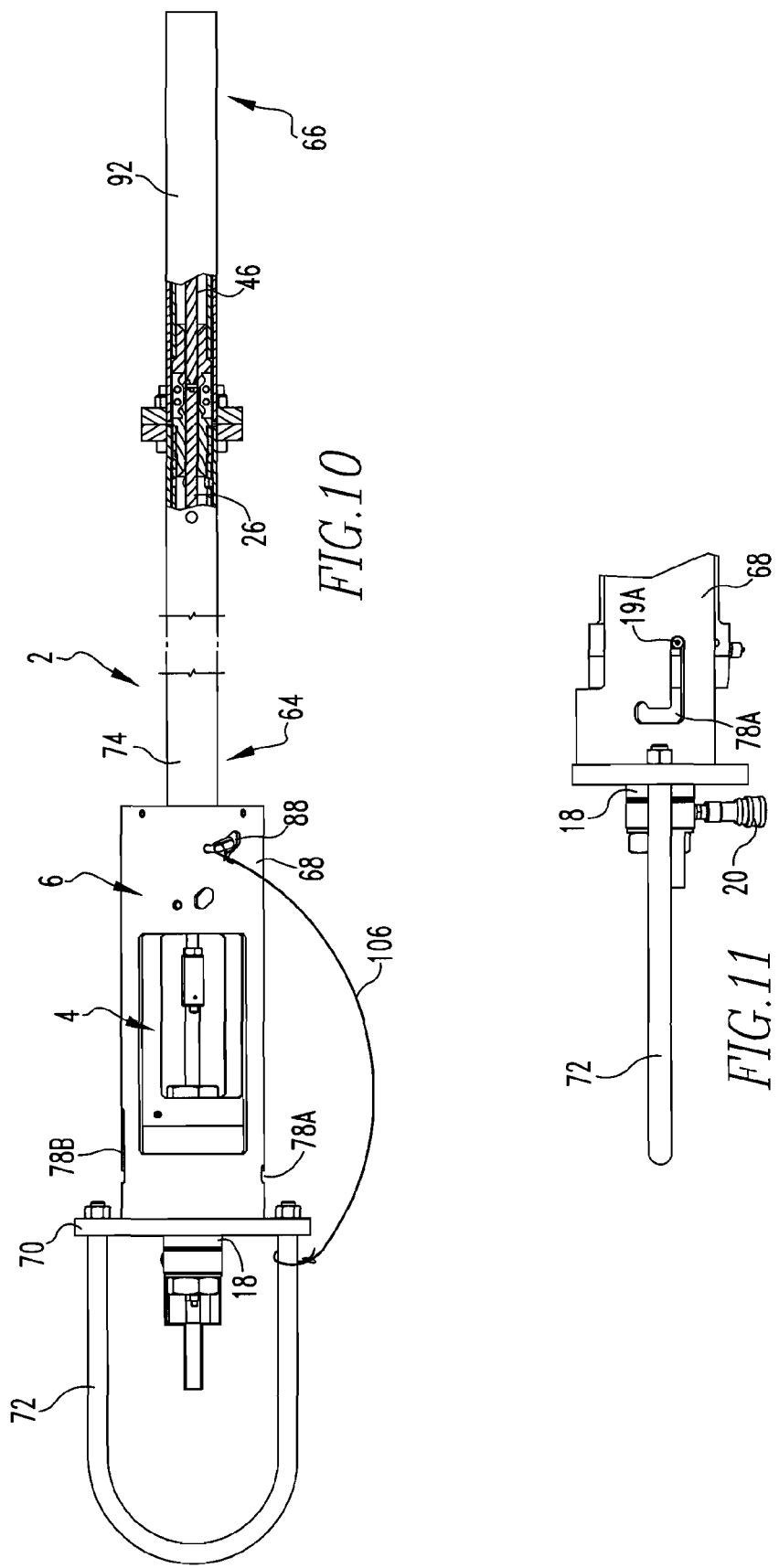

CONTROL ROD DRIVE SHAFT UNLATCHING TOOL

CROSS-REFERENCE TO RELATED APPLICATIONS

This application claims priority under 35 U.S.C. §119(e) from U.S. Provisional Application No. 61/352,484, entitled "Mechanical Control Rod Drive Shaft Unlatching Tool", filed on Jun. 8, 2010, the disclosure of which is incorporated herein by reference.

BACKGROUND OF THE INVENTION

1. Field of the Invention

The present invention relates to nuclear power plants, such as, without limitation, pressurized water reactor (PWR) type nuclear power plants, and in particular to a tool for unlatching and removing a control rod drive shaft in a nuclear reactor vessel.

2. Description of the Related Art

In nuclear power generation, a reactor vessel is the primary vessel wherein heat is generated for producing steam. The reactor vessel typically includes a flanged body having a flanged, removable upper closure head bolted atop its upper portion for forming a sealed enclosure. Fuel pellets, which are located within fuel assemblies, are positioned within the reactor vessel for producing a controlled nuclear fission reaction which, in turn, generates heat. The heat generated by the fission reaction heats borated water that is contained within the reactor vessel. Process piping, generally referred to in the art as a primary loop, is attached to the reactor vessel. The heated borated water flows out of the reactor vessel and passes through the primary loop to a steam generator for transferring its heat to a secondary loop, wherein steam is produced for ultimately producing electrical power, as is well known in the art. The borated water then returns to the reactor vessel via the primary loop where the above described process is repeated. In a pressurized water reactor (PWR), and in contrast to a boiling water reactor (BWR), pressure in the primary loop prevents the borated water from boiling within the reactor.

The rate of the fission reaction taking place within each fuel assembly is regulated by means of an associated control rod assembly. Each control rod assembly is formed from an array of stainless steel tubes containing a neutron absorbing substance, such as silver, indium or cadmium. These stainless steel tubes (known as "rodlets" in the art) are suspended from a spider-like bracket, and a control rod drive shaft (CRDS) is connected to the spider-like bracket. Each CRDS is also coupled to a control rod drive mechanism (CRDM) carried by the closure head. Each CRDM is structured to either insert or withdraw the rodlets of the associated control rod assembly deeper into or farther out of the associated fuel assembly in order to modulate the amount of heat generated thereby.

Periodically, nuclear reactors must be refueled, a process wherein a fraction of the fuel assemblies of the reactor are replaced. During the refueling of a nuclear reactor, the closure head is removed, the reactor vessel is flooded with water and the upper internals of the reactor vessel are removed. When this is done, however, the rodlets need to remain in place within the reactor vessel. Thus, prior to removing the upper internals of the reactor vessel, each CRDS (which is carried by the upper internals) must be disconnected from the cluster of rodlets to which it is attached so that the rodlets will not be carried away with the drive shaft but instead will remain in place. More specifically, each spider bracket has a grooved circular ferrule hub and the bottom of each CRDS has a pair of fingers that are received in the ferrule to couple the CRDS to the spider bracket. This connection must be released so that the CRDS can be removed from the reactor vessel while leaving the rodlets in place.

For some time, a prior art CRDS unlatching tool has been used to release the connection between a CRDS and a spider bracket. That tool uses a first pneumatic mechanism to actuate a first set of latch fingers provided on a button shaft which engage a top portion of the CRDS and disengage the CRDS from the spider bracket (it causes the fingers to be released from the ferrule hub) and a second pneumatic mechanism to actuate a second set of latch fingers which engage an outer surface of the CRDS and allow it to be held by the tool while it is removed. The problem with this prior art tool is that it undesirably permits a tool operator to inadvertently actuate the air cylinders of the second pneumatic mechanism while the tool is latched onto the CRDS, thereby allowing the CRDS to fall out of the tool. As will be appreciated, this has the potential to cause costly damage to the CRDS itself and to nearby equipment and/or injury to nearby personnel.

SUMMARY OF THE INVENTION

In one embodiment, a tool for unlatching a control rod drive shaft of a nuclear reactor vessel is provided that includes a support assembly structured to receive the control rod drive shaft in a first end thereof and a latching assembly, wherein the support assembly is received within the latching assembly in a manner wherein the latching assembly is moveable relative to the support assembly. The support assembly has a plurality of latch fingers positioned at the first end thereof and at least one pin positioned at a second end thereof, each of the latch fingers being movable between a latched position wherein the latch finger is structured to engage and hold the control rod drive shaft when the control rod drive shaft is received in the first end and an unlatched position wherein the latch finger is structured to not engage the control rod drive shaft when the control rod drive shaft is received in the first end. The latching assembly includes a first sleeve member at a first end thereof and a second sleeve member at a second end thereof, the second sleeve member having at least one slot, wherein the at least one pin is moveably received within the at least one slot, wherein the latching assembly is movable in an unlatching manner from a latched state to an unlatched state wherein the latching assembly slides relative to the support assembly in a first direction and causes the first sleeve member to engage each latch finger and move each latch finger from the latched position to the unlatched position and wherein the latching assembly is movable in a latching manner from the unlatched state to the latched state wherein the latching assembly slides relative to the support assembly in a second direction opposite the first direction and causes the first sleeve member to engage each latch finger and move each latch finger from the unlatched position to the latched position.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 is a side elevational view of a lower support assembly of the CRDS unlatching tool of FIGS. 1 and 2;

FIG. 6 is a cross-sectional view of the lower support assembly of FIG. 5 taken along lines 6-6 of FIG. 5.

FIGS. 7 and 8 show how the upper support assembly and the lower support assembly of the CRDS unlatching tool of FIGS. 1 and 2 are coupled to one another;

FIGS. 9, 10 and 11 show the CRDS unlatching tool of FIGS. 1 and 2 in an unlatched, button down state.

DETAILED DESCRIPTION OF THE EXEMPLARY EMBODIMENTS

Figure 1:
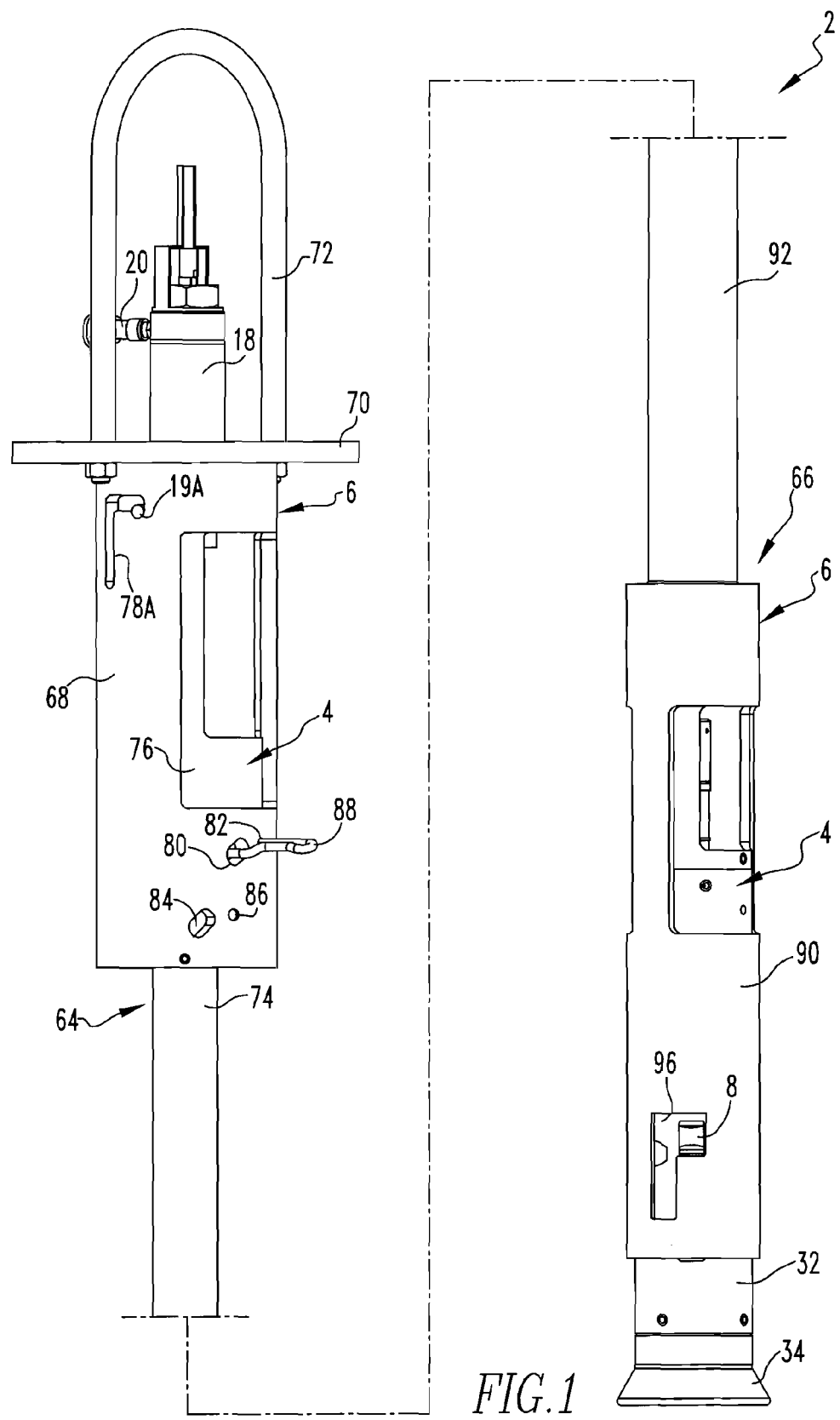
FIGS. 1 and 2 are schematic diagrams of a CRDS unlatching tool according to one exemplary embodiment of the present invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

Figure 2:
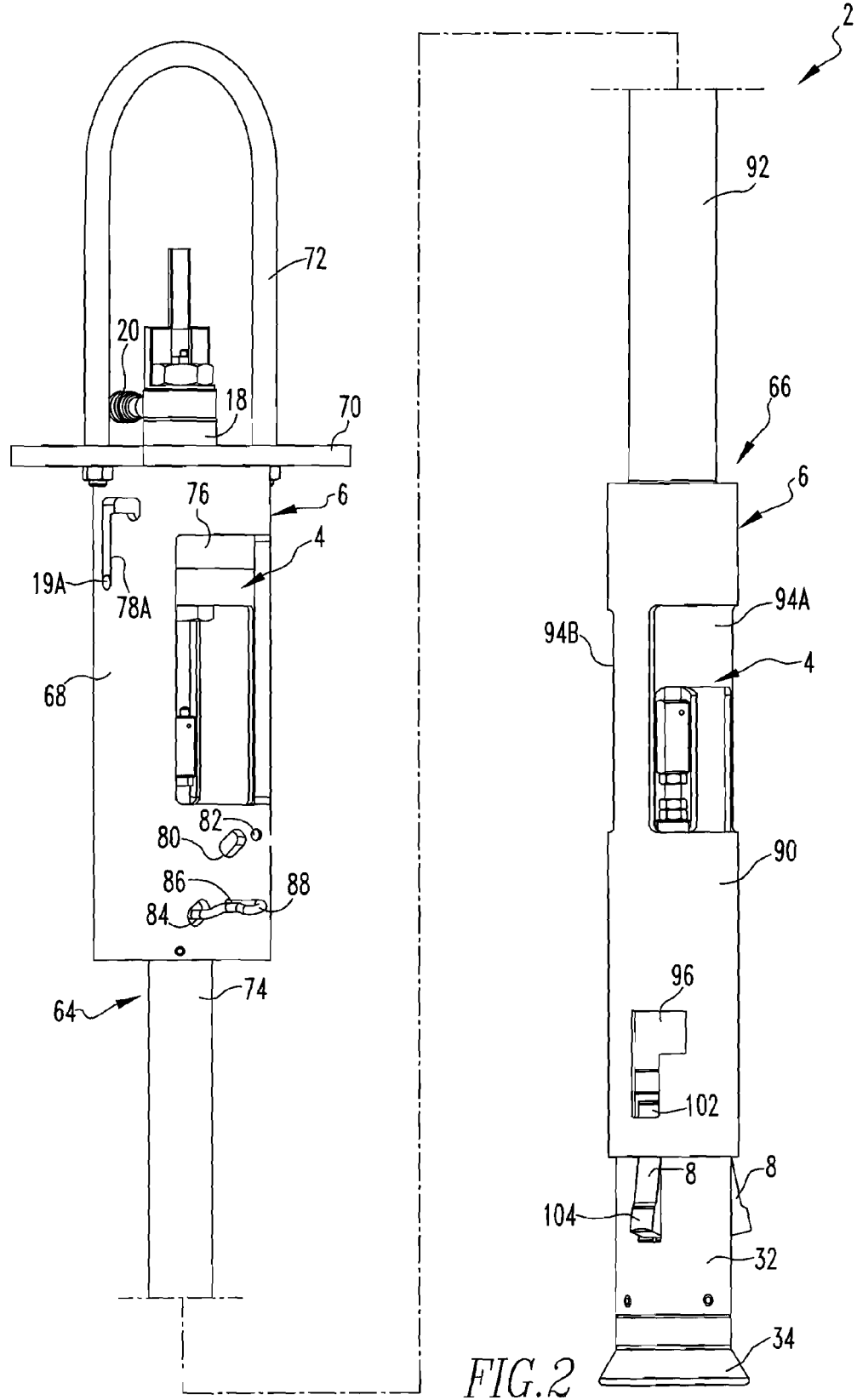

FIGS. 1 and 2 are schematic diagrams of a CRDS unlatching tool 2 according to one exemplary embodiment of the present invention. In FIG. 1, CRDS unlatching tool 2 is shown in a latched condition wherein is structured to engage the outer surface of a CRDS and securely hold the CRDS, and in FIG. 2, CRDS unlatching tool 2 is shown in an unlatched condition wherein a CRDS is not held by the tool. As described in greater detail herein, CRDS unlatching tool 2 provides a mechanical latching function which replaces the pneumatically operated latch gripper assembly of the prior art described above (i.e., the second pneumatic mechanism). More specifically, and as described in greater detail below, the CRDS unlatching tool 2 incorporates a mechanical interlock to prevent a tool operator from inadvertently unlatching a CRDS from CRDS unlatching tool 2 during operation.

CRDS unlatching tool 2 includes a CRDS support assembly 4 that is provided within a mechanical latching assembly 6. As described in detail herein, CRDS support assembly 4 is structured to engage a top portion of the CRDS and disengage the CRDS from the spider bracket, and mechanical latching assembly 6 is structured to actuate latch fingers 8 which engage an outer surface of the CRDS and allow it to be held by the CRDS unlatching tool 2 while it is removed.

Figure 3:
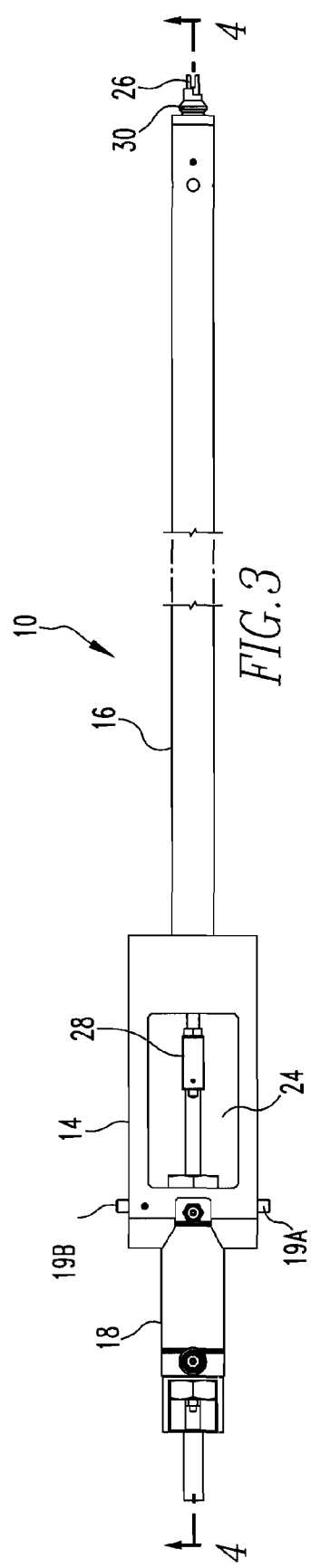
FIG. 3 is a side elevational view of an upper support assembly of the CRDS unlatching tool of FIGS. 1 and 2.
Figure 4:
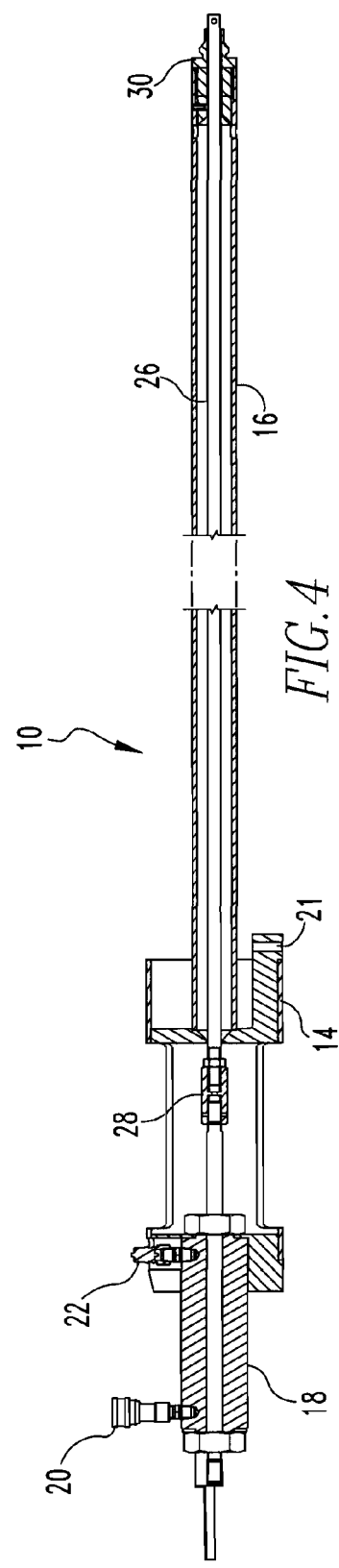
FIG. 4 is a cross-sectional view of the upper support assembly of FIG. 3 taken along lines 4-4 of FIG. 3.
Figure 9:
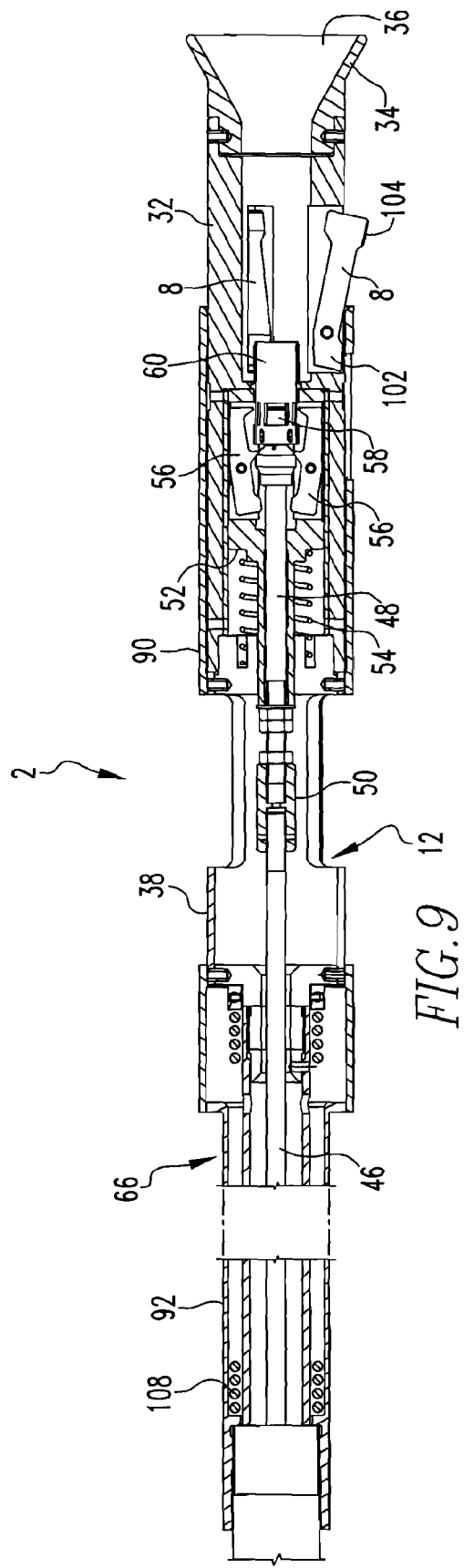

Referring to FIGS. 3-6, CRDS support assembly 4 includes an upper support assembly 10 coupled to a lower support assembly 12. FIG. 3 is a side elevational view of upper support assembly 10 and FIG. 4 is a cross-sectional view of upper support assembly 10 taken along lines 4-4 of FIG. 3. FIG. 5 is a side elevational view of lower support assembly 12 and FIG. 6 is a cross-sectional view of lower support assembly 12 taken along lines 6-6 of FIG. 5.

Referring to FIGS. 3 and 4, upper support assembly 10 includes a shroud 14 having a first inner tube portion 16 attached thereto. In addition, a pneumatic cylinder 18 having couplings 20, 22 attached thereto is coupled to the top of shroud 14. Dowel pins 19A and 19B extend from opposite sides of shroud 14, and a hole 21 is provided in the lower end of shroud 14. The functions of dowel pins 19A and 19B and hole 21 are described elsewhere herein. Shroud 14 also includes at least one window 24. Upper support assembly 10 further includes an upper button shaft member 26 that is moveably housed within first inner tube portion 16. Upper button shaft member 26 extends through shroud 14 and is operatively coupled to pneumatic cylinder 18 through coupling 28. Pneumatic cylinder 18, coupled to a pneumatic source through a valve assembly (not shown), is thus able to selectively drive upper button shaft member 26 within first inner tube portion 16 along the longitudinal axis thereof. A threaded adaptor 30 is provided at the distal end of first inner tube portion 16 and upper button shaft member 26. The function of threaded adaptor 30 is described elsewhere herein.

Referring to FIGS. 5 and 6, lower support assembly 12 includes a lower housing 32 having an adaptor 34 coupled thereto which defines a CRDS receiving orifice 36. A shroud 38 having a window 40 is coupled to the other end of lower housing 32. A second inner tube portion 42 is coupled to shroud 38 through an adaptor 44. Lower support assembly 12 also includes a lower button shaft member 46 that is moveably housed within second inner tube portion 42. Lower button shaft member 46 is coupled to an actuator 48 having an actuator housing 52 by a coupling 50. As seen in FIG. 6, a spring 54 is provided within lower housing 32 and is structured to bias actuator 48 forward toward adaptor 34 and CRDS receiving orifice 36. Actuator 48 is operatively coupled to button fingers 56 such that when actuator 48 is pulled backwards against the spring bias as described elsewhere herein, button fingers 56 will be caused to pivot and extend through holes 58 provided in cylindrical member 60 of actuator 48 to grab and hold the top portion of the CRDS and disengage the CRDS from the spider bracket (as described elsewhere herein, it causes the lower fingers of the CRDS to be released from the ferrule hub of the spider bracket). In addition, the latch fingers 8 described elsewhere herein, which are structured to engage and hold the outside to the CRDS, are pivotably held within lower housing 32. The manner in which the latch fingers 8 are selectively actuated is described elsewhere herein. In the illustrated embodiment, lower housing 32 includes three latch fingers 8, although more or less latch fingers 8 may be provided in lower housing 32 within the scope of the present invention. A welded adaptor 62 is provided at the distal end of second inner tube portion 42 and lower button shaft member 46. The function of welded adaptor 62 is described elsewhere herein.

Referring again to FIGS. 1 and 2, mechanical latching assembly 6 includes an upper latch member 64 and a lower latch member 66. Upper latch member 66 includes an upper latch housing 68. A bail plate 70 having a bail 72 is attached, preferably by welding, to the top end of upper latch housing 68. An upper tube 74 is attached, preferably by welding, to the bottom end of upper latch housing 68. Upper latch housing 68 has at least one window 76 provided therein. An inverted J-shaped slot 78A is provided on a first side of upper latch housing 68. A similar inverted J-shaped slot 78B is provided on a second side of upper latch housing 68 opposite the first side. A latch orifices 80 and 82 and an unlatch orifices 84 and 86, each structured to receive a respective end of a pin member 88, are also provided within upper latch housing 68 near the bottomed end thereof. The function of each of these components is described elsewhere herein.

Lower latch member 66 includes a lower latch housing (sleeve) 90. A lower tube 92 is attached, preferably by welding, to the top end of lower latch housing 90. Lower latch housing 90 has windows 94A, 94B provided therein. In addition, three inverted L-shaped slots 96 are provided on the lower end of lower latch housing 90. As seen in FIGS. 1 and 2, the L-shaped slots 96 are structured to be in alignment with latch fingers 8.

In the exemplary embodiment, CRDS unlatching tool 2 is assembled as follows. First, upper support assembly 10 is inserted into upper latch member 64 through upper tube 74 and lower support assembly 12 is inserted into lower latch member 66 through lower latch housing 90. When this is done, the end of upper support assembly 10 is allowed to extend slightly out of upper tube 74 and the end of lower support assembly 12 is allowed to extend slightly out of lower tube 92. Next, upper support assembly 10 and lower support assembly 12 are coupled to one another as shown in FIGS. 7 and 8. More specifically, lower button shaft member 46 and upper button shaft member 26 are coupled to one another using a dowel pin 9 as seen in FIGS. 7 and 8. Next, coupling halves 98A, 98B are provided around the junction of threaded adaptor 30 and welded adaptor 62 and secured to one another using any suitable means such as a number of screws. Next, upper latch member 64 and lower latch member 66 are slid toward another and secured to one another by bolting the two components together through flanges 100A, 100B that are provided, preferably by welding, on the ends of upper tube 74 and lower tube 92, respectively. In addition, when so assembled, each dowel pin 19A, 19B is received through a respective inverted J-shaped slot 78A, 78B. Also, each latch finger 8 is aligned with a respective L-shaped slot 96.

The operation of CRDS unlatching tool 2 will now be described. During operation of CRDS unlatching tool 2, the various states thereof will be determined by two things: (i) the position of the latch fingers 8, i.e., whether they are portioned inward so as to engage and grip the outer surface of a CRDS (latched) or outward so as to be out of engagement with the outer surface of a CRDS (unlatched), and (ii) the position of the button shaft formed by upper button shaft member 26 and lower button shaft member 46, i.e., whether it is pneumatically driven up or down within CRDS support assembly 4. When the button shaft is up, button fingers 56 will be caused to pivot and extend through holes 58 provided in cylindrical member 60 of actuator 48 to grab and hold the top portion of the CRDS, and conversely, when the button shaft driven down, button fingers 56 will be caused to pivot out of holes 58.

For purposes of describing operation of CRDS unlatching tool 2, the following discussion will commence with CRDS unlatching tool 2 in an unlatched, button down state as shown in FIGS. 2, 9, 10 and 11. In the unlatched, button down state, mechanical latching assembly 6 is in a raised, upward position such that the bottom portion of lower latch housing 90 is positioned toward the top end of lower housing 32. In this state, the bottom of longer portion of the L-shaped slots will engage the top of each latch finger 8 (at an upper 102 thereof) and cause it to extend outwardly beneath lower latch housing 90 and out of the interior chamber of lower housing 32. In addition, each dowel pin 19A, 19B will be positioned at and against the bottom terminal end of the associated J-shaped slot 78A, 78B (FIGS. 2 and 11). Furthermore, in this state, the position of upper latch housing 68 will cause unlatch orifice 86 to be aligned with and positioned over hole 21 of shroud 14. In the exemplary embodiment, a first end of pin member 88 is inserted into unlatch orifice 86 and hole 21 and a second end of pin member 88 is inserted into unlatch orifice 84. Pin member 88 thus acts as a locking mechanism that prevents movement of mechanical latching assembly 6 relative to CRDS support assembly 4 until the pin member 88 is removed. In the exemplary embodiment, pin member 88 is attached to bail 72 by a lanyard 106.

Figure 12:
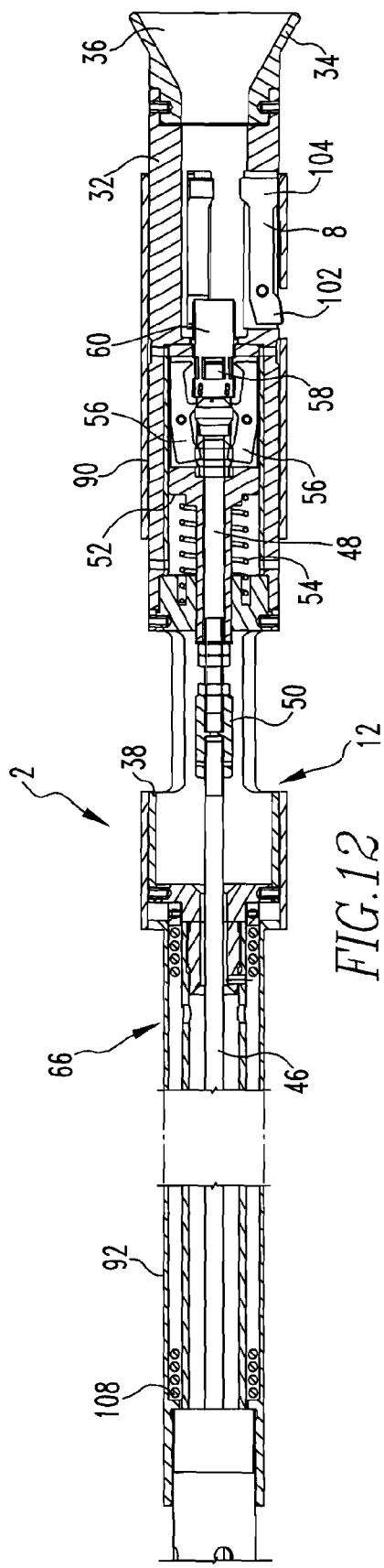
FIGS. 12, 13 and 14 show the CRDS unlatching tool of FIGS. 1 and 2 in a latched, button down state.
Figure 13:
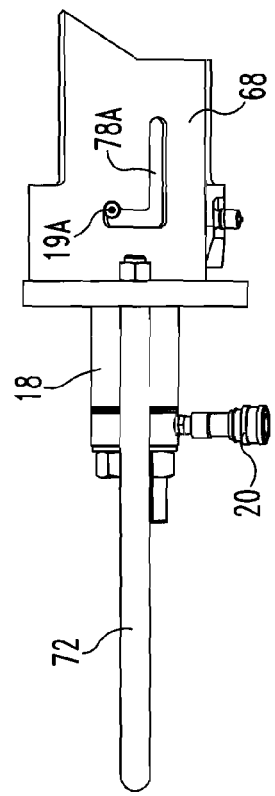

Next, to remove a CRDS, CRDS unlatching tool 2 is placed over the CRDS in a manner wherein the CRDS is received through CRDS receiving orifice 36 into the interior chamber of lower housing 32. Pin member 88 is then removed from 21 and unlatch orifices 86 and 84. CRDS unlatching tool 2 is then moved to a latched, button down state as shown in FIGS. 1, 7, 12 and 13. This is done by lowering the mechanical latch assembly 6 (moving it to the right is FIG. 11), rotating it clockwise (by rotating bail 72), and lifting it slightly to latch. During this process, dowel pins 19A and 19B will traverse the length of the associated J-shaped slot 78A, 78B such that each ends up in the position shown in FIGS. 1 and 13 wherein it is positioned at and against the top, opposite terminal end of the associated J-shaped slot 78A, 78B in the notch formed thereby. Also during this process, the bottom portion of lower latch housing 90 will be moved toward the bottom end of lower housing 32 as shown in FIG. 1. During such movement, the bottom edge of lower latch housing 90 will engage a lower cam 104 on the outside of each latch finger 8 and force latch finger 8 into the interior chamber of lower housing 32 as shown in FIG. 12 so that the latch fingers 8 will engage and hold the CADS. Moreover, upper cam 102 of each latch finger will be received within the shorter portion of the L-shaped slots as seen in FIGS. 1 and 12. In this state, upper latch housing 68 will be positioned in a manner wherein latch orifice 82 is aligned with and positioned over hole 21 of shroud 14. The operator then inserts the first end of pin member 88 into latch orifice 82 and hole 21 and the second end of pin member 88 is inserted into latch orifice 80 to lock CRDS unlatching tool 2 in the latched state.

Figure 14:
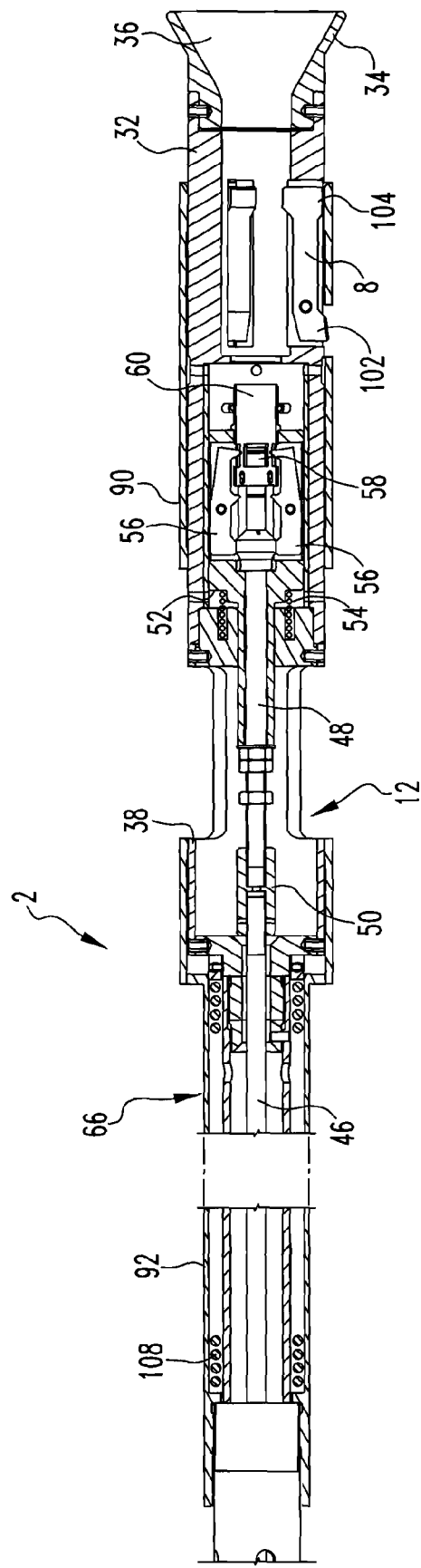

Next, CRDS unlatching tool 2 is moved to a latched, button up state as shown in FIG. 14 by pneumatically driving the button shaft formed by upper button shaft member 26 and lower button shaft member 46 up toward the top of CRDS unlatching tool 2 as described elsewhere herein. When this is done, actuator 48 is pulled backwards against the spring bias as described elsewhere herein, and button fingers 56 are caused to pivot and extend through holes 58 provided in cylindrical member 60 of actuator 48 to grab and hold the top portion of the CRDS and disengage the CRDS from the spider bracket. With the CRDS disengaged from the spider bracket and held by the latch fingers 8, CRDS unlatching tool 2 and thus the CRDS it holds may be safely removed from the reactor vessel (e.g., using a hoist coupled to bail 72) and moved to a storage location. Spring 108 inside mechanical latching assembly 6 is used to support the weight of CRDS latch assembly 6 when CRDS unlatching tool 2 is moved by the operator. Once safely removed from the reactor vessel, the process just described above may be reversed to move the CRDS unlatching tool 2 back to the unlatched, button down state with pin member 88 in the UNLATCH position (in unlatch orifices 84 and 86) so that CRDS unlatching tool 2 can be separated from the CRDS (e.g., again using a hoist coupled to bail 72) and used to remove another CRDS. The mechanical latching and unlatching mechanism just described replaces the prior art design which required two valve operated air cylinders to move the latch assembly strictly up and down.

Thus, it will be appreciated that CRDS unlatching tool 2 reduces the danger of a CRDS being dropped. More specifically, this danger is reduced because CRDS support assembly 4 hangs from mechanical latching assembly 6 with each dowel pin 19A, 19B in the notch at the end of the horizontal portion of the associated inverted L-shaped slot 78A, 78B. This feature will not permit the CRDS to be unlatched from the CRDS unlatching tool 2 unless the CRDS is resting on (i.e., uncoupled from) or in (i.e., coupled to) the control rod hub (the spider bracket) or the CRDS is seated in a CRDS storage stand location mounted, for example, on the wall of the refueling cavity. This action permits the mechanical latching assembly to be lowered slightly to move the inverted J-shaped slot 78A, 78B down and away from contact with dowel pins 19A, 19B. This is only possible when the operator removes the one-piece pin member 88 from the LATCH location (latch orifices 80 and 82). As noted above, pin member 88 is secured from dropping by lanyard 106.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A tool for unlatching a control rod drive shaft of a nuclear reactor vessel, comprising:
   a support assembly structured to receive the control rod drive shaft in a first end thereof, the support assembly having a plurality of latch fingers positioned at the first end thereof and at least one pin positioned at a second end thereof, each of the latch fingers being movable between a latched position wherein the latch finger is structured to engage and hold the control rod drive shaft when the control rod drive shaft is received in the first end and an unlatched position wherein the latch fingers are structured to not engage the control rod drive shaft when the control rod drive shaft is received in the first end; and
   a latching assembly, wherein the support assembly is received within the latching assembly in a manner wherein the latching assembly is moveable relative to the support assembly, the latching assembly including a first sleeve member at a first end thereof and a second sleeve member at a second end thereof, the second sleeve member having at least one inverted J-shaped slot having a first portion having a first terminal end comprising a notch, a second portion having a second terminal end, and a middle portion provided between the first portion and the second portion, the second portion being longer than the first portion, the inverted J-shaped slot being positioned such that the first terminal end is located a first distance from the latch fingers and the second terminal end is located a second distance from the latch fingers that is shorter than the first distance, wherein the at least one pin is moveably received within the at least one inverted J-shaped slot, wherein the latching assembly is movable in an unlatching manner from a latched state to an unlatched state wherein the latching assembly slides relative to the support assembly in a first direction and causes the first sleeve member to engage each latch finger and move each latch finger from the latched position to the unlatched position and wherein the latching assembly is movable in a latching manner from the unlatched state to the latched state wherein the latching assembly slides relative to the support assembly in a second direction opposite the first direction and causes the first sleeve member to engage each latch finger and move each latch finger from the unlatched position to the latched position, wherein in the latched state the at least one pin rests against the first terminal end of the inverted J-shaped slot in a manner wherein the support assembly hangs from the latching assembly, wherein during movement in the unlatching manner the latching assembly rotates relative to the support assembly in a first rotational direction and the at least one pin moves from the first terminal end of the inverted J-shaped slot to a second terminal end of the inverted J-shaped, wherein during movement in the latching manner the latching assembly rotates relative to the support assembly in a second rotational direction opposite the first rotational direction and the at least one pin moves from the second terminal end of the inverted J-shaped slot to the first terminal end of the inverted J-shaped slot during movement in the latching manner, and wherein during movement in the unlatching manner the latching assembly first slides in the second direction, then rotates in the first rotational direction and then slides in the first direction, and wherein during movement in the latching manner the latching assembly first slides in the second direction, then rotates in the second rotational direction and then slides in the first direction.

2. The tool according to claim 1, wherein the support assembly is structured to selectively grab and hold a top portion of the control rod drive shaft and disengage the control rod drive shaft from a bracket of the nuclear reactor vessel.

3. The tool according to claim 2, wherein the support assembly includes a plurality of selectively moveable button fingers structured to gab and hold the top portion of the CRDS and disengage the CRDS from a spider bracket.

4. The tool according to claim 3, wherein the button fingers are selectively pneumatically actuated.

5. The tool according to claim 1, wherein the at least one pin is at least two pins including a first pin and a second pin, wherein the at least one inverted J-shaped slot is a first inverted J-shaped slot in which the first pin is received and a second inverted J-shaped slot in which the second pin is received, wherein the first pin moves from a first terminal end of the first inverted J-shaped slot to a second terminal end of the first inverted J-shaped slot and the second pin moves from a first terminal end of the second inverted J-shaped slot to a second terminal end of the second inverted J-shaped slot during movement in the unlatching manner, and wherein the first pin moves from the second terminal end of the first inverted J-shaped slot to the second terminal end of the first inverted J-shaped slot and the second pin moves from the second terminal end of the second inverted J-shaped slot to the second terminal end of the second inverted J-shaped slot during movement in the latching manner.

6. The tool according to claim 1, wherein the first sleeve member includes a plurality of L-shaped slots extending through the first sleeve member, wherein each L-shaped slot receives a cam portion of a respective one of the latch fingers such that the cam portion extends through the first sleeve member.

7. The tool according to claim 1, further comprising a locking pin member, wherein the second sleeve member includes a latch hole, wherein the second end of the support assembly includes a receiving hole, wherein in the latched state the receiving hole is aligned with the latch hole and the receiving hole and the latch hole are structured to receive the locking pin member to prevent relative movement between the latching assembly and the support assembly.

8. The tool according to claim 7, wherein the second sleeve member includes an unlatch hole, wherein in the unlatched state the receiving hole is aligned with the unlatch hole and the receiving hole and the unlatch hole are structured to receive the locking pin member to prevent relative movement between the latching assembly and the support assembly.

* * * * *